United States Patent
Okada et al.

(10) Patent No.: US 11,522,614 B2
(45) Date of Patent: Dec. 6, 2022

(54) CONTROL APPARATUS, CONNECTION STATUS REGISTRATION METHOD AND PROGRAM

(71) Applicant: Nippon Telegraph and Telephone Corporation, Tokyo (JP)

(72) Inventors: Shingo Okada, Tokyo (JP); Takuya Tojo, Tokyo (JP); Seisho Yasukawa, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/291,485

(22) PCT Filed: Nov. 11, 2019

(86) PCT No.: PCT/JP2019/044162
§ 371 (c)(1),
(2) Date: May 5, 2021

(87) PCT Pub. No.: WO2020/100822
PCT Pub. Date: May 22, 2020

(65) Prior Publication Data
US 2022/0006529 A1    Jan. 6, 2022

(30) Foreign Application Priority Data
Nov. 14, 2018    (JP) .............................. JP2018-214204

(51) Int. Cl.
*H04B 10/27*    (2013.01)
*H04B 10/073*    (2013.01)
*H04Q 11/00*    (2006.01)

(52) U.S. Cl.
CPC ........... *H04B 10/27* (2013.01); *H04B 10/073* (2013.01); *H04Q 11/0067* (2013.01)

(58) Field of Classification Search
None
See application file for complete search history.

(56) References Cited

U.S. PATENT DOCUMENTS

| | | | | |
|---|---|---|---|---|
| 2005/0232629 | A1* | 10/2005 | Amemiya | H04Q 11/0005 398/45 |
| 2012/0201534 | A1* | 8/2012 | Miyashita | H04J 14/0221 398/79 |
| 2015/0304041 | A1* | 10/2015 | Schemmann | H04J 14/0232 398/72 |

OTHER PUBLICATIONS

[No. Author Listed], "Open ROADM," Open ROADM v2 General Whitepaper, available no later than Nov. 14, 2018, 2 pages.

(Continued)

*Primary Examiner* — David W Lambert
(74) *Attorney, Agent, or Firm* — Fish & Richardson P.C.

(57) ABSTRACT

A control apparatus for registering a connection state between component devices constituting a distributed optical transmission apparatus in a database includes: a device setting unit which performs setting such that light is output from a component device that is a connection source; and a registration processing unit which acquires a light reception level of each port in each component device on a side receiving the light, identifies a port having a light reception level higher than light reception levels of other ports, and registers a component device having the identified port and the identified port in the database as a connection destination of the component device that is the connection source.

18 Claims, 10 Drawing Sheets

(56) References Cited

OTHER PUBLICATIONS

Leenheer et al., "Open and Disaggregated Transport Networks," Presented at Open Optical Conference, Dallas, TX, Nov. 2, 2017, 25 pages.

* cited by examiner

CONTROL APPARATUS, CONNECTION STATUS REGISTRATION METHOD AND PROGRAM

CROSS-REFERENCE TO RELATED APPLICATIONS

This application is a National Stage application under 35 U.S.C. § 371 of International Application No. PCT/JP2019/044162, having an International Filing Date of Nov. 11, 2019, which claims priority to Japanese Application Serial No. 2018-214204, filed on Nov. 14, 2018. The disclosure of the prior application is considered part of the disclosure of this application, and is incorporated in its entirety into this application.

TECHNICAL FIELD

The present invention relates to a technology for managing a connection state between component devices in a distributed optical transmission apparatus in which component devices are present in a distributed manner.

BACKGROUND ART

Although a network is constructed by a single vendor and controlled by a network management system (NMS) made by the vendor in a conventional transmission apparatus, in general, transmission networks of multiple vendors and disaggregation (function distribution) of a transmission apparatus can be achieved according to recent technical improvement.

In particular, in a reconfigurable optical add/drop multiplexer (ROADM), a chassis type ROADM equipped with all functions such as a transponder, an optical switch, and an amplifier has been general until now, but examination of a disaggregation ROADM in which respective functions are realized as individual housings and combined to operate as a single ROADM is being actively conducted.

Meanwhile, with respect to management of each device according to management of an entire network by an NMS of a target vendor due to construction by a single vendor until now, integrated management of networks constructed by multiple vendors has become a problem and a means for managing the networks in an integrated manner is being examined in OSS projects (ODTN, OpenROADM) (NPL 1 and 2).

CITATION LIST

Non Patent Literature

[NPL 1] Open and Disaggregated Transport Networks (https://www.lightwaveonline.com/content/dam/lw/Marketing/2017-11-02_OpenDisaggregatedTransportNetworks.pdf)

[NPL 2] Open ROADM (https://0201.nccdn.net/4_2/000/000/05e/0e7/Open-ROADM-whitepaper-v2_2.pdf)

SUMMARY OF THE INVENTION

Technical Problem

Recently, SDN control of a transmission apparatus and distribution (disaggregation) of components have been discussed. In practice, products having an open API for SDN control and a product independent for each component (WSS (optical switch) part or AMP part) have begun to be sold, and thus an effective control method therefor is required.

In control of a disaggregation ROADM, particularly, it is necessary to individually control all devices constituting the disaggregation ROADM in contrast with the conventional technology in which one device is controlled.

Figure 1:
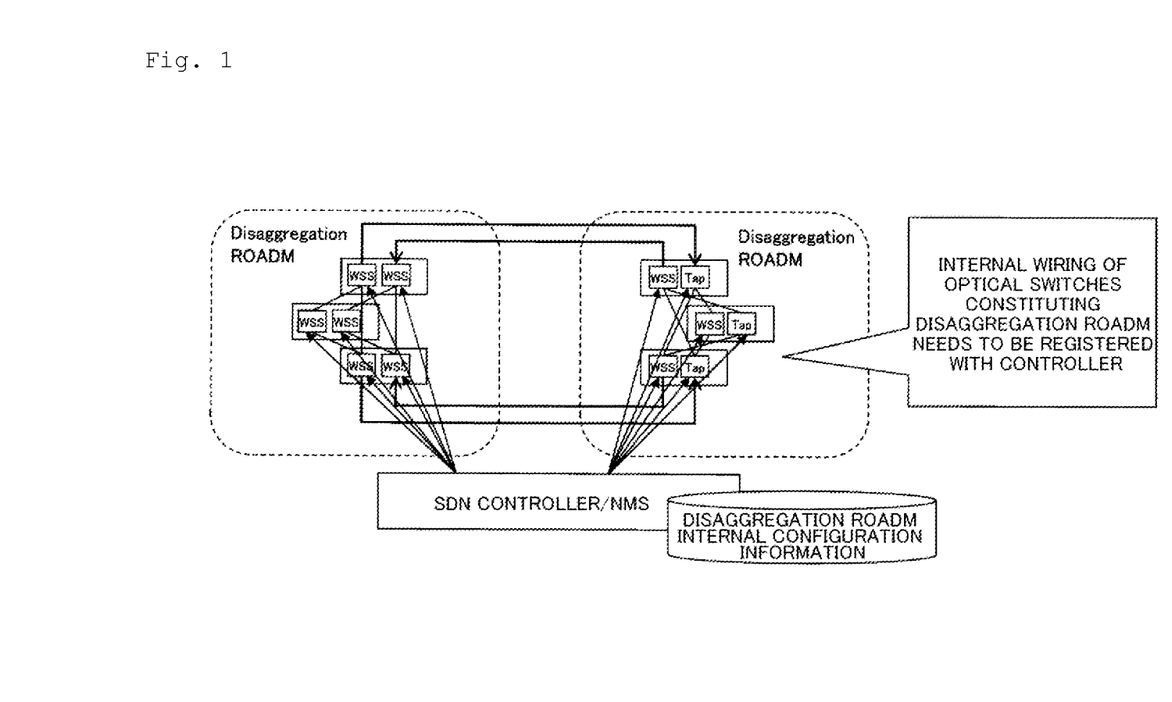
FIG. 1 a diagram for describing problems.

To control a disaggregation ROADM, a controller (SDN controller or NMS) needs to include wiring information (connection states) of all devices and component devices constituting the disaggregation ROADM in a database as registration information. An image thereof is shown in FIG. 1.

However, there are problems that the number of component devices increases as the number of routes of ROADM increases and wiring information is complicated and thus increases in quantity so that registration in the database become difficult.

An object of the present invention devised in view of the aforementioned point is to provide a technology for allowing dynamic detection of a connection state between component devices constituting a distributed optical transmission apparatus and registration of the connection state in a database.

Means for Solving the Problem

According to the disclosed technology, a control apparatus for registering a connection state between component devices constituting a distributed optical transmission apparatus in a database, which includes: a device setting unit which performs setting such that light is output from a component device that is a connection source; and a registration processing unit which acquires a light reception level of each port in each component device on a side receiving the light, identifies a port having a light reception level higher than light reception levels of other ports, and registers a component device having the identified port and the identified port in the database as a connection destination of the component device that is the connection source, is provided.

Effects of the Invention

According to the disclosed technology, a technology for allowing dynamic detection of a connection state between component devices constituting a distributed optical transmission apparatus and registration of the connection state in a database is provided.

DESCRIPTION OF EMBODIMENTS

Hereinafter, embodiments of the present invention will be described with reference to the drawings. Embodiments which will be described below are merely examples and embodiments to which the present invention is applied are not limited to the embodiments which will be described below. Although the disaggregation ROADM will be described as an example of a distributed optical transmission apparatus in the embodiments which will be described below, the present invention is not limited to the disaggregation ROADM and can also be applied to other types of transmission apparatus.

Overview of Embodiment

In the present embodiment, a connection state between wavelength selective switch (WSS) parts (optical switches) is automatically detected and registered in a database by controlling the WSS parts and AMP parts (light amplification devices) constituting the disaggregation ROADM by a controller.

Figure 2:
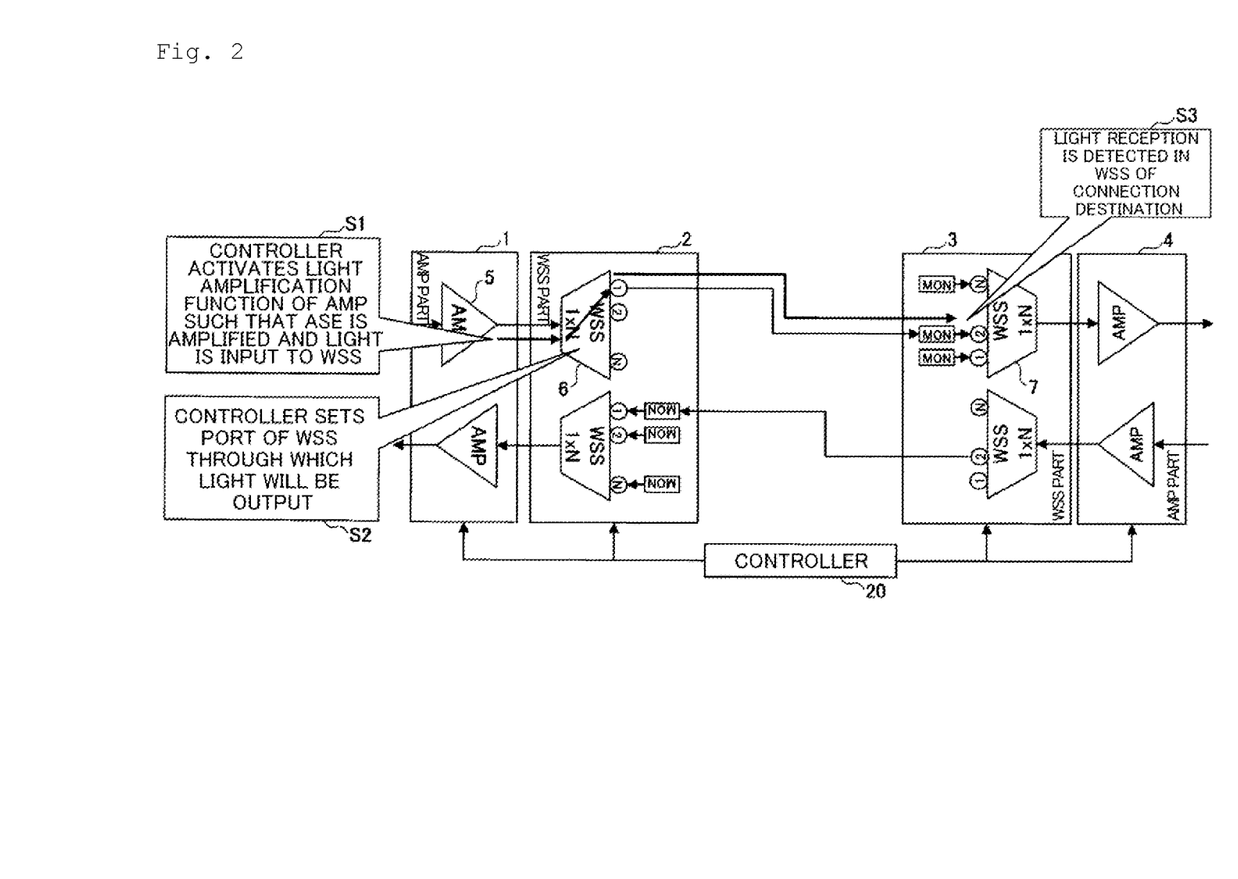
FIG. 2 is a diagram for describing an overview of an embodiment.

An overview of automatic detection processing will be described with reference to FIG. 2. FIG. 2 shows a controller 20, and an AMP part 1, a WSS part 2, a WSS part 3, and an AMP part 4 constituting the disaggregation ROADM.

In the example shown in FIG. 2, the controller 20 performs input of light to a WSS 6 of the WSS part 2 connected thereto by activating a light amplification device (AMP5) of the AMP part 1 and using an amplified spontaneous emission (ASE) light source that amplifies spontaneously emitted light and uses it as a light source in S1 (step 1). The controller 20 sets a port of the WSS 6 through which light will be output in S2.

In S3, the controller 20 detects a connection state of WSS parts by monitoring optical levels of all connection ports in a WSS 7 of the WSS part 3 and confirming reception of light. In the present embodiment, it is possible to confirm light reception in a WSS without a special test optical device by using ASE.

An internal connection situation of the disaggregation ROADM can be registered in the database of the controller 20 by performing the above-described procedure on all ports of all WSS parts.

With respect to WSS parts, there are two types of patterns: a device having 1×N WSSs in both sides of IN/OUT; and a device having WSSs only on the IN side and having a splitter on the OUT side. The technology according to the present invention can automatically detect a connection state of WSS parts of the disaggregation ROADM whichever pattern is used.

Hereinafter, embodiments will be described in more detail. An example of a case in which a disaggregation ROADM of a Route and Select model is used will be described as a first embodiment and an example of a case in which a disaggregation ROADM of a Broadcast and Select model is used will be described as a second embodiment. Meanwhile, a configuration in which a WSS part has 1×N WSSs on both sides of IN/OUT corresponds to the Route and Select model and a configuration having WSSs only on an IN side and having a splitter on an OUT side corresponds to the Broadcast and Select model.

First Embodiment

<System Configuration>

Figure 3:
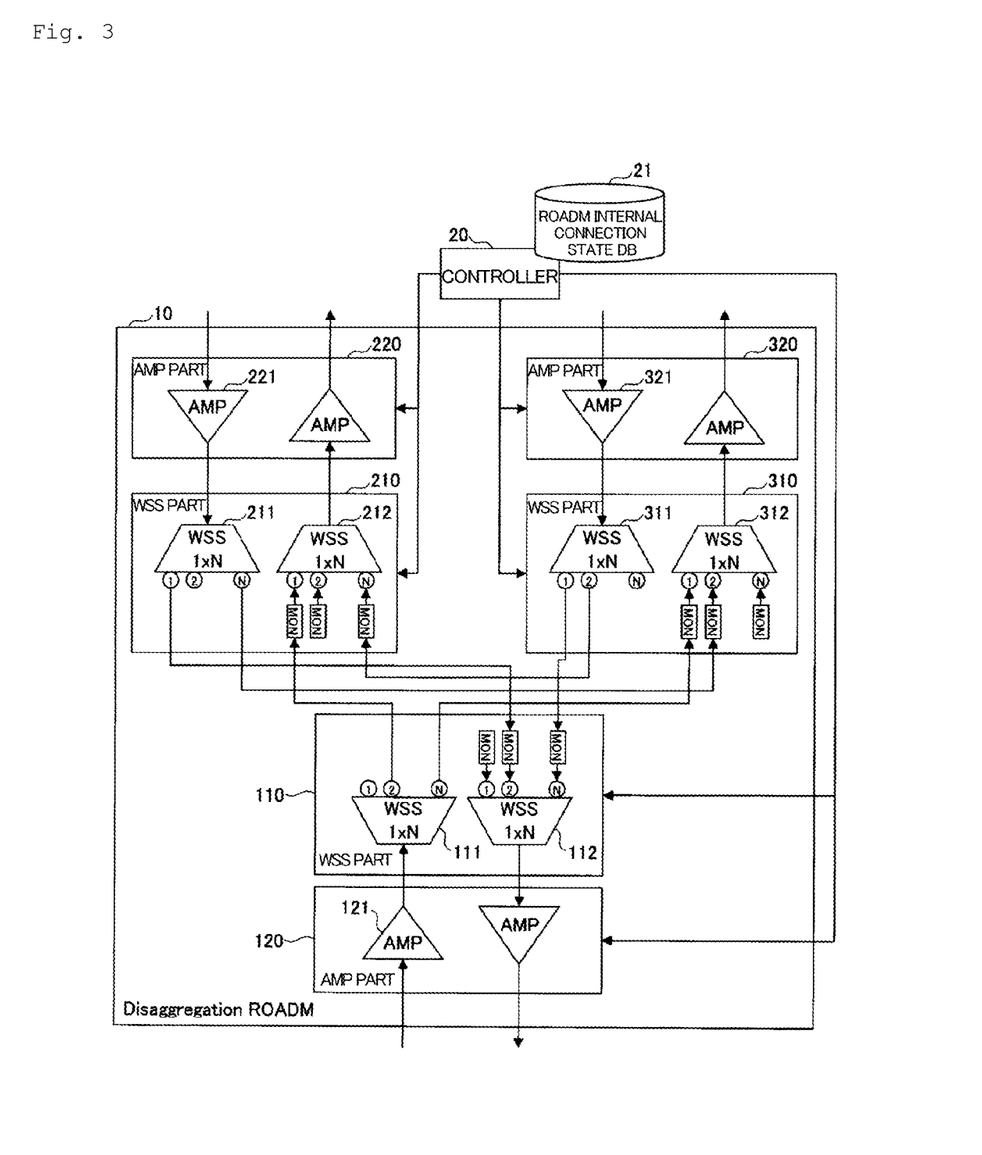
FIG. 3 is a system configuration diagram in a first embodiment.

FIG. 3 shows a system configuration diagram in the first embodiment. As shown in FIG. 3, the present system includes a disaggregation ROADM 10 and a controller 20 and has a configuration in which they are connected through a network. In addition, a ROADM internal connection state DB 21 that is a database device is included, and the controller 20 can read/write data from/to the ROADM internal connection state DB 21. The ROADM internal connection state DB 21 may be present in the controller 20 or outside the controller 20.

The disaggregation ROADM 10 includes WSS parts 110, 210 and 310, and AMP parts 120, 220 and 320. Each AMP part includes an input side AMP and an output side AMP, and each WSS part includes 1×N WSSs on an input side and 1×N WSSs on an output side. Each WSS has ports #1 to #N. Meanwhile, a WSS is an example of an optical switch. An AMP is an example of a light amplification device.

Figure 4:
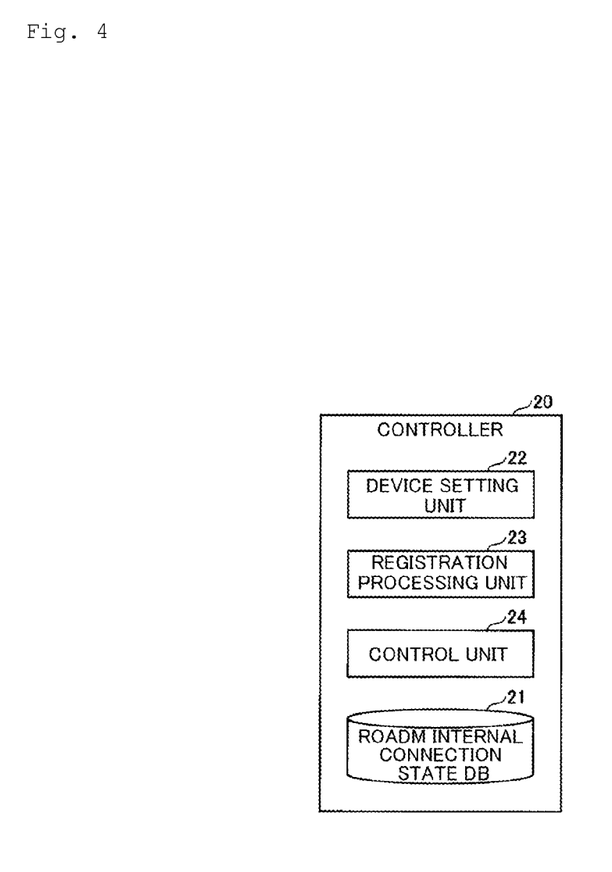
FIG. 4 is a functional configuration diagram of a controller.

FIG. 4 is a functional configuration diagram of the controller 20. FIG. 4 shows an example in which the controller 20 has the ROADM internal connection state DB 21.

As shown in FIG. 4, the controller 20 includes a device setting unit 22 which performs setting and the like on the ROADM internal connection state DB 21 and each component device constituting the disaggregation ROADM 10, a registration processing unit 23 which performs registration of wiring information on the basis of light reception levels that are port monitoring results, and a control unit 24 which performs control of a processing procedure, and the like. Meanwhile, the operation of the controller 20 will be described in detail later. The controller 20 may be called a control apparatus.

The controller 20 can be realized, for example, by a computer executing a program that describes processing details described in the present embodiment.

That is, the controller 20 can be realized by executing a program corresponding to processing performed in the controller 20 using hardware resources such as a CPU and a memory included in a computer. The aforementioned program can be recorded and stored in a computer-readable recording medium (portable memory or the like) and distributed. In addition, the aforementioned program can also be provided through a network such as the Internet, e-mail, or the like.

Figure 5:
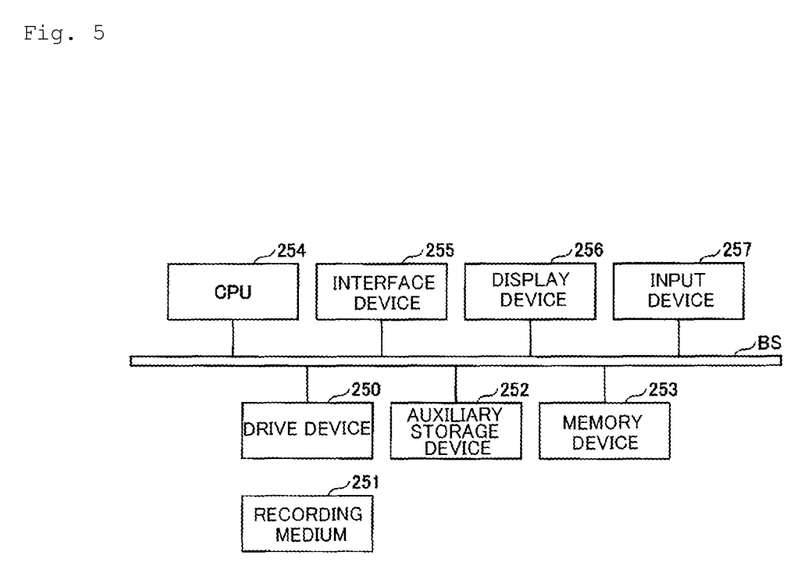
FIG. 5 is a hardware configuration diagram of the controller.

FIG. 5 is a diagram showing a hardware configuration example of the aforementioned computer in the present embodiment. The computer of FIG. 5 includes a drive device 250, an auxiliary storage device 252, a memory device 253, a CPU 254, an interface device 255, a display device 256, an input device 257, and the like which are connected through a bus B.

A program for realizing processing in the computer is provided, for example, through a recording medium 251 such as a CD-ROM or a memory card. When the recording medium 251 in which the program is stored is set in the drive device 250, the program is installed from the recording medium 251 to the auxiliary storage device 252 via the drive device 250. However, installation of the program is not necessarily performed by the recording medium 251 and the program may be downloaded from other computers via a network. The auxiliary storage device 252 stores the installed program and stores necessary files, data, and the like.

The memory device 253 reads a program from the auxiliary storage device 252 and stores the program when starting of the program has been instructed. The CPU 254 realizes functions relating to the controller 20 according to the program stored in the memory device 253. The interface device 255 is used as an interface for connection to a network. The display device 256 displays a graphical user interface (GUI) and the like according to a program. The input device 257 is configured as a keyboard, a mouse, buttons, a touch panel, or the like and used to input various operation instructions.

<System Operation>

Figure 6:
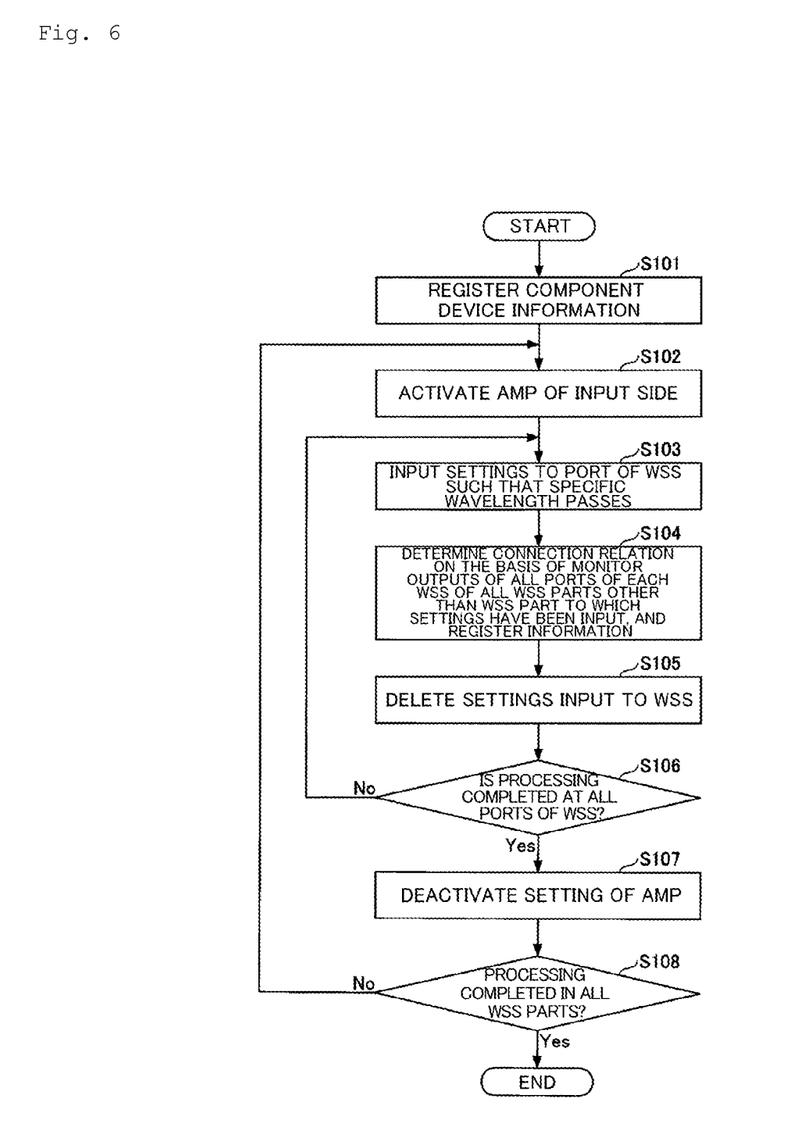
FIG. 6 is a flowchart showing a processing procedure in the first embodiment.

Next, the system operation in the first embodiment shown in FIG. 3 will be described according to a procedure of a flowchart shown in FIG. 6.

Figure 7:
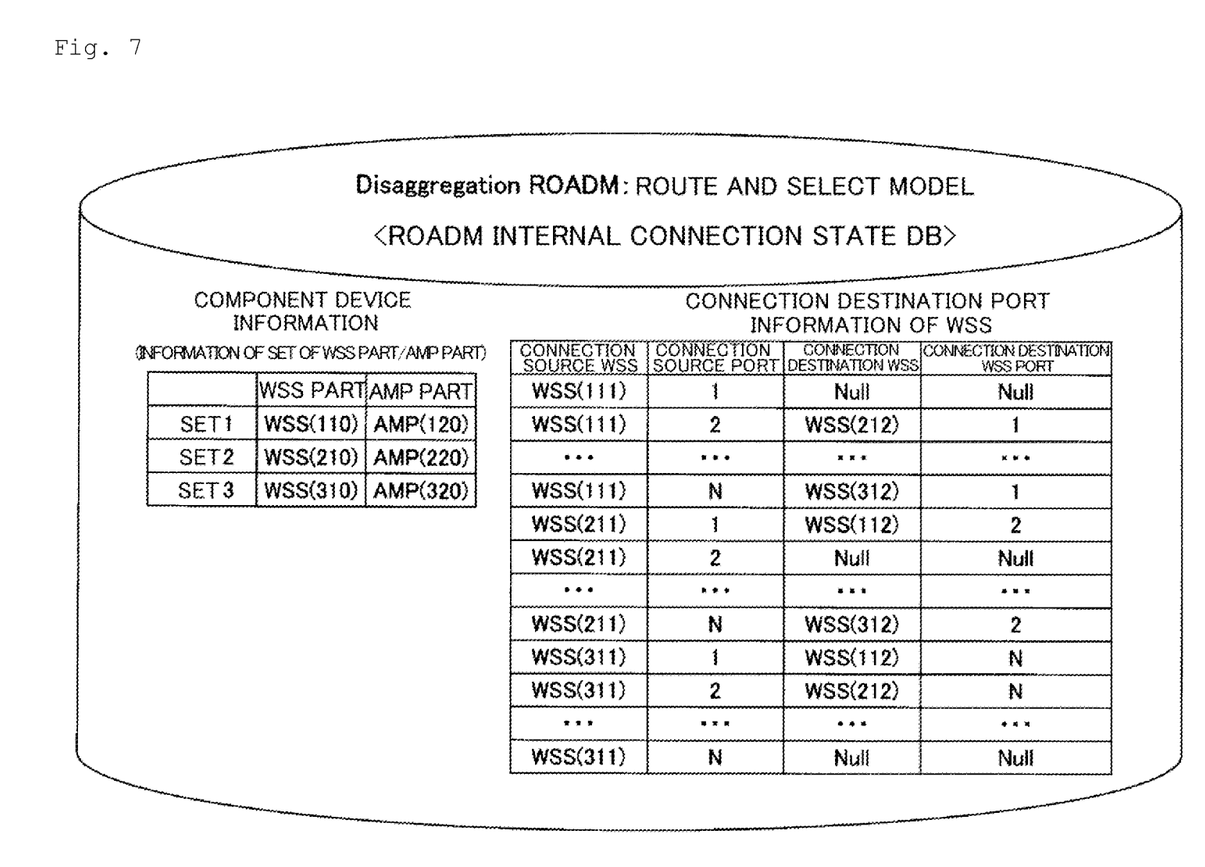
FIG. 7 is a diagram showing an example of information stored in a ROADM internal connection state DB in the first embodiment.

In S101, sets of the WSS parts 110, 210 and 310 and the AMP parts 120, 220 and 320 constituting the disaggregation ROADM 10 and the number of ports of the WSS parts are input to the controller 20 such that the ROADM internal connection state DB 21 has component device information. An example of the component device information stored in the ROADM internal connection state DB 21 is shown in FIG. 7.

In S102, the device setting unit 22 of the controller 20 activates an AMP 121 on the input side of one AMP part 120 from among registered AMP parts. Accordingly, ASE is amplified and light is input to a WSS 111 on the input side of the WSS part 110 registered with the activated AMP part 120 as a set.

In S103, the device setting unit 22 of the controller 20 inputs settings by which a specific wavelength passes to port #1 of the WSS 111. Accordingly, light is output from port #1 of the WSS 111.

In S104, the registration processing unit 23 of the controller 20 acquires monitor outputs of all ports of WSSs 212 and 312 of all WSS parts 210 and 310 other than the WSS part 110 to which the settings have been input. Further, the registration processing unit 23 of the controller 20 identifies a port having a light reception level definitely higher than other ports and registers the port in the ROADM internal connection state DB 21 as a connection destination WSS/connection destination WSS port of a connection source port 1 of the connection source WSS 111. A case in which there is no port having a definitely higher light reception level is determined as absence of a connection destination and "null" is registered.

Meanwhile, the port having a light reception level definitely higher than other ports is, for example, a port having a highest light reception level and a port for which a difference between this light reception level and a light reception level of a port having a lowest light reception level is equal to or greater than a predetermined threshold value. However, this is merely an example.

In S105, the device setting unit 22 of the controller 20 deletes the settings input to the WSS 111. Accordingly, light is not output from port #1 of the WSS 111.

Next, S103 to S105 are repeatedly performed while sequentially changing a set port number of the WSS 111 in S103 from #2 to #N (S106) according to control of the control unit 24. Accordingly, information of connection destinations of all ports of the WSS 111 can be registered in the ROADM internal connection state DB 21.

In S107, the device setting unit 22 of the controller 20 deactivates setting of the AMP 121 activated in S102. The controller 20 performs S102 to S107 on the WSS parts 210 and 310 on which S102 to S107 have not yet been performed according to control of the control unit 24 (S108).

An example of connection destination port information of WSSs acquired as results of the above-described processing is shown in FIG. 7.

Second Embodiment

<System Configuration>

Figure 8:
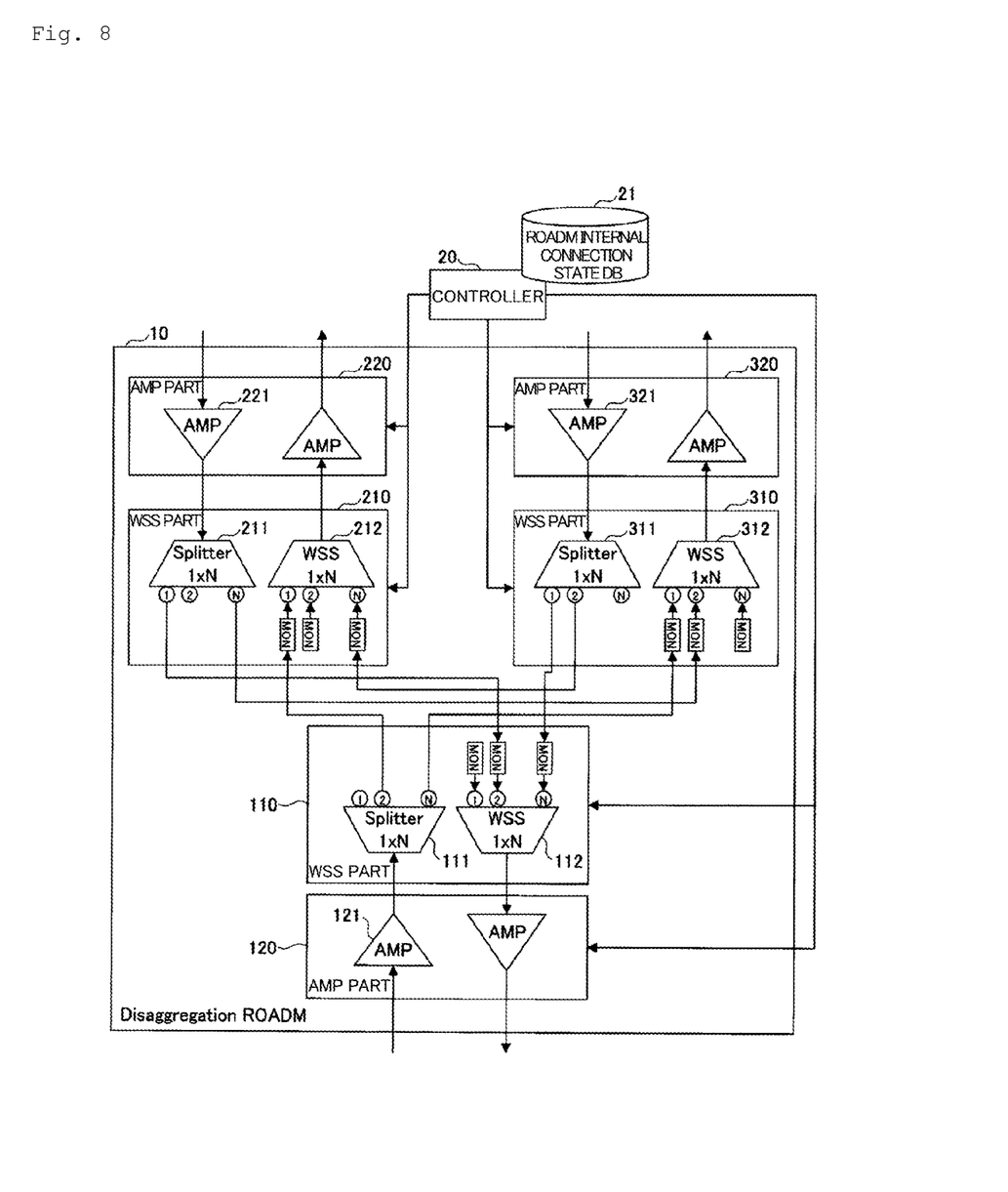
FIG. 8 is a system configuration diagram in a second embodiment.

FIG. 8 shows a system configuration diagram in a second embodiment. As shown in FIG. 8, a system includes the disaggregation ROADM 10 and the controller 20 and has a configuration in which they are connected through a network. In addition, the ROADM internal connection state DB 21 that is a database device is included, and the controller 20 can read/write data from/to the ROADM internal connection state DB 21. The ROADM internal connection state DB 21 may be present in the controller 20 or outside the controller 20.

In the second embodiment, the internal configuration of the disaggregation ROADM 10 differs from that of the first embodiment. Specifically, as shown in FIGS. 3 and 8, 1×N WSSs 111, 211 and 311 respectively become 1×N splitters 111, 211 and 311. Except for this, the second embodiment is identical to the first embodiment.

The functional configuration of the controller 20 (FIG. 4) and the fact that the controller 20 can be realized by a computer and a program are the same as in the first embodiment as well.

<System Operation>

Figure 9:
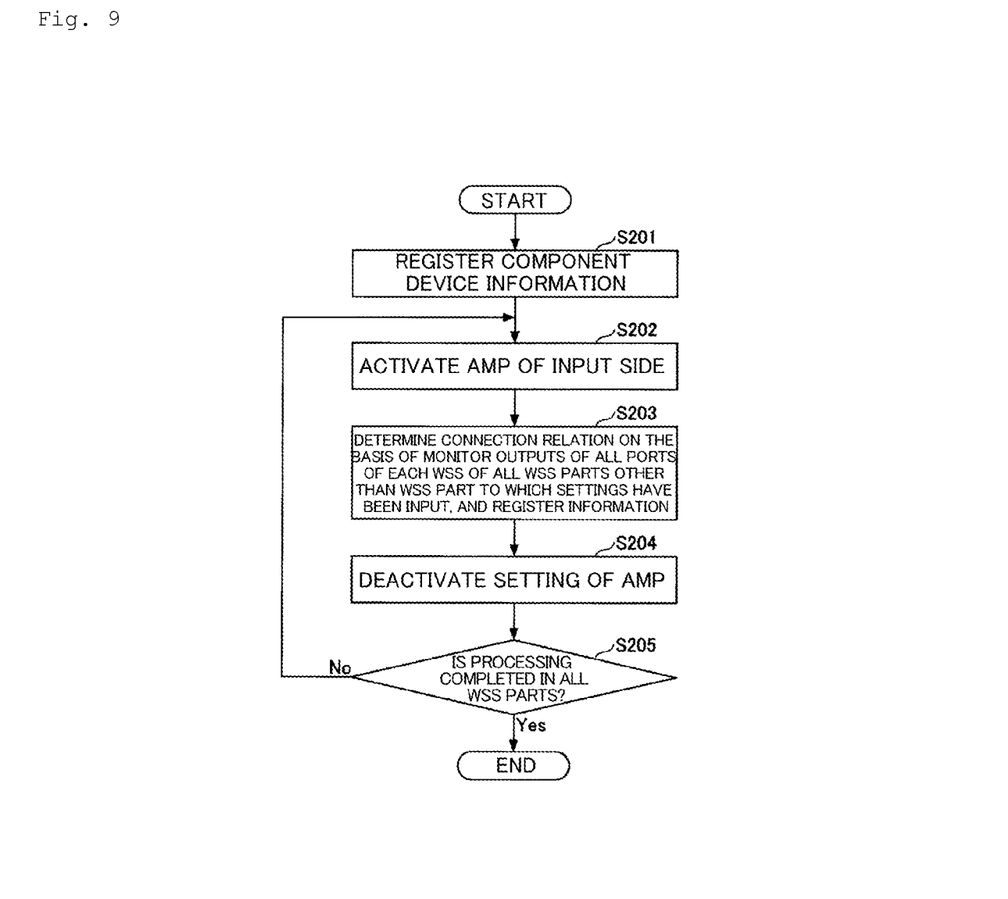
FIG. 9 is a flowchart showing a processing procedure in the second embodiment.

Next, a system operation in the second embodiment will be described according to a procedure of a flowchart shown in FIG. 9.

Figure 10:
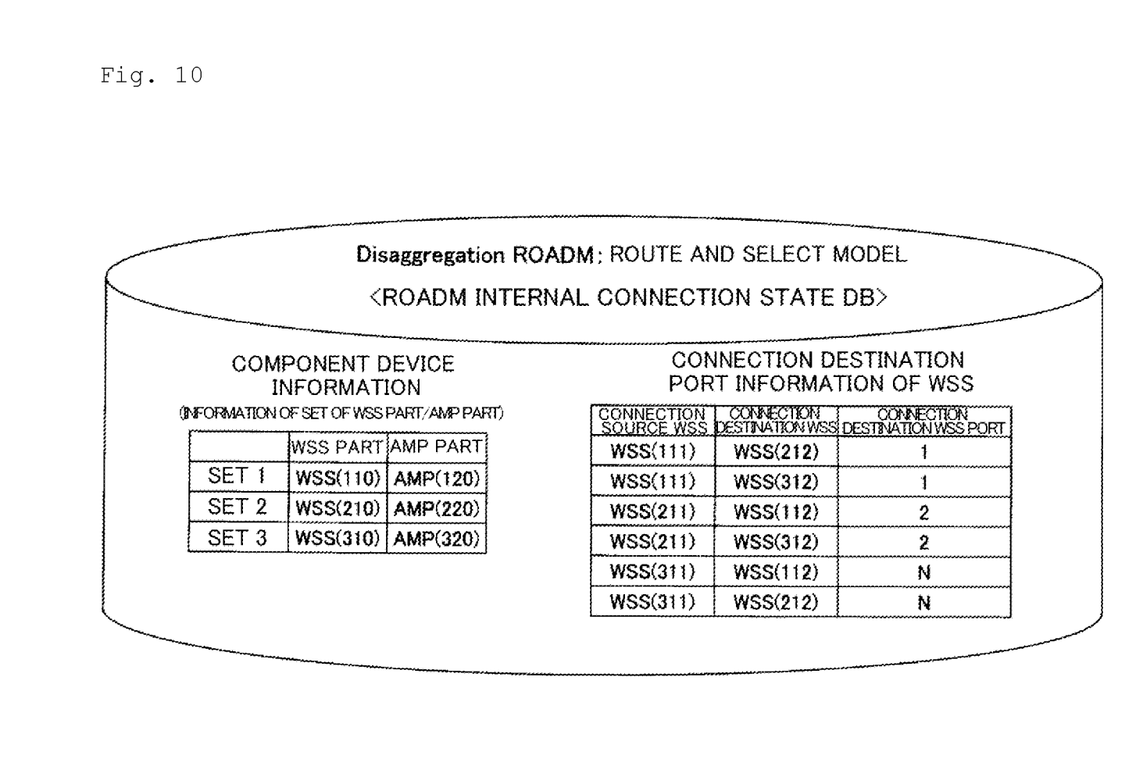
FIG. 10 is a diagram showing an example of information stored in a ROADM internal connection state DB in the second embodiment.

In S201, sets of the WSS parts 110, 210 and 310 and the AMP parts 120, 220 and 320 constituting the disaggregation ROADM 10 and the number of ports of the WSS parts are input to the controller 20 such that the ROADM internal connection state DB 21 has component device information. An example of the component device information stored in the ROADM internal connection state DB 21 is shown in FIG. 10.

In S5202, the device setting unit 22 of the controller 20 activates the AMP 121 on the input side of one AMP part 120 from among registered AMP parts. Accordingly, ASE is amplified, light is input to the splitter 111 on the input side of the WSS part 110 registered with the activated AMP part as a set, and light is output through all ports of the splitter 111.

In S5203, the registration processing unit 23 of the controller 20 acquires monitor outputs of all ports of WSSs 212 and 312 of all WSS parts 210 and 310 other than the WSS part 110 to which settings have been input. Further, the registration processing unit 23 of the controller 20 identifies a port having a light reception level definitely higher than other ports and registers the port in the ROADM internal connection state DB 21 as a connection destination WSS/connection destination WSS port of the connection source WSS 111.

The port having a light reception level definitely higher than other ports is, for example, a port for which a difference between the light reception level of the port and a light reception level of a port having a lowest light reception level is equal to or greater than a predetermined threshold value. However, this is merely an example.

When there is a plurality of ports having definitely higher light reception levels, all of the plurality of ports are registered as connection destination WSSs/connection destination WSS ports. A case in which there is no port having a definitely higher light reception level is determined as absence of a connection destination and "null" is registered.

S204, the device setting unit 22 of the controller 20 deactivates setting of the AMP 121 activated in S202.

The controller 20 performs S202 to S204 on the WSS parts 210 and 310 on which S202 to S204 have not yet been performed (S205).

An example of connection destination port information of WSSs acquired as results of the above-described processing is shown in FIG. 10.

Effects of Embodiments

According to embodiments of the present invention, it is possible to automatically detect and register internal connection information necessary when the disaggregation ROADM is controlled through the controller. By using this technology, manual information registration with the controller becomes unnecessary. In addition, this technology can also be used as a test for checking whether information manually registered is correct.

Furthermore, in embodiments of the present invention, it is possible to output light by using spontaneously emitted light without a special device that emits test light.

Summary of Embodiments

At least the following contents are disclosed in the present specification.
(First Article)

A control apparatus for registering a connection state between component devices constituting a distributed optical transmission apparatus in a database, the control apparatus including:

a device setting unit which performs setting such that light is output from a component device that is a connection source; and a registration processing unit which acquires a light reception level of each port in each component device on a side receiving the light, identifies a port having a light reception level higher than light reception levels of other ports, and registers a component device having the identified port and the identified port in the database as a connection destination of the component device that is the connection source.

The disaggregation ROADM 10 and the controller 20 in the first and second embodiments are examples of a distributed optical transmission apparatus and a control apparatus, respectively. In addition, identifying a port having a light reception level higher than light reception levels of other ports is, for example, identifying a port having a light reception level definitely higher than light reception levels of other ports, as described above.
(Second Article)

The control apparatus according to the first article, wherein the component device that is the connection source is an optical switch, and the device setting unit performs setting such that light is output from one port in the optical switch, the registration processing unit registers the component device having the identified port and the identified port in the database as a connection destination of the one port of the optical switch, and processing performed by the device setting unit and processing performed by the registration processing unit are repeatedly performed while changing ports in the optical switch.
(Third Article)

The control apparatus according to the first article, wherein the component device that is the connection source is an optical splitter, and light is output from all ports of the optical splitter according to setting of the device setting unit.
(Fourth Article)

The control apparatus according to any one of the first to third articles, wherein the device setting unit allows light acquired by amplifying spontaneously emitted light to be input to the component device that is the connection source by activating a light amplification device connected to the component device that is the connection source.
(Fifth Article)

A connection state registration method performed by a control apparatus for registering a connection state between component devices constituting a distributed optical transmission apparatus in a database, the connection state registration method including:

a device setting step of performing setting such that light is output from a component device that is a connection source; and a registration processing step of acquiring a light reception level of each port in each component device on a side receiving the light, identifying a port having a light reception level higher than light reception levels of other ports, and registering a component device having the identified port and the identified port in the database as a connection destination of the component device that is the connection source.
(Sixth Article)

A program for causing a computer to serve as each part in the control apparatus according to any one of the first to fourth articles.

While the present embodiment has been described above, the present invention is not limited to such a specific embodiment and various modifications and substitutions can be made without departing from the spirit or scope of the present invention described in the claims.

REFERENCE SIGNS LIST

10 Disaggregation ROADM
21 ROADM internal connection state DB
22 Device setting unit
23 Registration processing unit
24 Control unit
250 Drive device
251 Recording medium
252 Auxiliary storage device
253 Memory device
254 CPU
255 Interface device
256 Display device
257 Input device

The invention claimed is:

1. A control apparatus for registering, in a database, a connection state between a plurality of component devices constituting a distributed optical transmission apparatus, the control apparatus comprising:

a device setting unit, including one or more processors, configured to control a first component device that is a connection source, among the plurality of component devices, to output light; and a registration processing unit, including one or more processors, configured to:
  acquire a light reception level of each of one or more ports included in one or more component devices disposed on a side receiving the light among the plurality of component devices,
  identify a port having a light reception level higher than light reception levels of other ports among the one or more ports, and
  register a component device having the identified port and the identified port in the database as a connection destination of the first component device.

2. The control apparatus according to claim 1, wherein:
the first component device is an optical switch including one or more ports,
the device setting unit is configured to control the optical switch such that light is output from one port in the optical switch,
the registration processing unit is configured to register the component device having the identified port and the identified port in the database as a connection destination of the one port of the optical switch, and
processing performed by the device setting unit and processing performed by the registration processing unit are repeatedly performed while changing ports in the optical switch.

3. The control apparatus according to claim 2, wherein the device setting unit is configured to cause a specific wavelength to pass to the one port.

4. The control apparatus according to claim 1,
wherein the first component device is an optical splitter, and
wherein the device setting unit is configured to control all ports of the optical splitter to output light.

5. The control apparatus according to claim 1, wherein the device setting unit is configured to allow light acquired by amplifying spontaneously emitted light to be input to the first component device by activating a light amplification device connected to the first component device.

6. The control apparatus according to claim 1, wherein the port having the light reception level higher than the light reception levels of the other ports is a port having a highest light reception level and a port for which a difference between the highest light reception level and a light reception level of a port having a lowest light reception level is equal to or greater than a predetermined threshold value.

7. A connection state registration method performed by a control apparatus for registering, in a database, a connection state between a plurality of component devices constituting a distributed optical transmission apparatus, the connection state registration method comprising:
  a device setting step of controlling a first component device that is a connection source, among the plurality of component devices, to output light; and
  a registration processing step of acquiring a light reception level of each of one or more ports included in one or more component devices disposed on a side receiving the light among the plurality of component devices, identifying a port having a light reception level higher than light reception levels of other ports among the one or more ports, and registering a component device having the identified port and the identified port in the database as a connection destination of the first component device.

8. The connection state registration method according to claim 7,
wherein the first component device is an optical switch, and
wherein the method further comprises:
  controlling the optical switch such that light is output from one port in the optical switch,
  registering the component device having the identified port and the identified port in the database as a connection destination of the one port of the optical switch, and
  repeatedly performing, while changing ports in the optical switch, the controlling and the registering.

9. The connection state registration method according to claim 8, wherein a specific wavelength passes to the one port.

10. The connection state registration method according to claim 7,
wherein the first component device is an optical splitter, and
wherein the method further comprises controlling all ports of the optical splitter to output light.

11. The connection state registration method according to claim 7, further comprising allowing light acquired by amplifying spontaneously emitted light to be input to the first component device by activating a light amplification device connected to the first component device.

12. The connection state registration method according to claim 7, wherein the port having the light reception level higher than the light reception levels of the other ports is a port having a highest light reception level and a port for which a difference between the highest light reception level and a light reception level of a port having a lowest light reception level is equal to or greater than a predetermined threshold value.

13. A non-transitory computer readable medium which stores a program for causing a computer to perform operations comprising:
  controlling a first component device that is a connection source, among a plurality of component devices constituting a distributed optical transmission apparatus, to output light; and
  acquiring a light reception level of each of one or more ports included in one or more component devices disposed on a side receiving the light among the plurality of component devices;
  identifying a port having a light reception level higher than light reception levels of other ports among the one or more ports; and
  registering a component device having the identified port and the identified port in a database as a connection destination of the first component device.

14. The non-transitory computer readable medium according to claim 13,
wherein the first component device is an optical switch, and
wherein the operations further comprise:
  controlling the optical switch such that light is output from one port in the optical switch,
  registering the component device having the identified port and the identified port in the database as a connection destination of the one port of the optical switch, and
  repeatedly performing, while changing ports in the optical switch, the controlling and the registering.

15. The non-transitory computer readable medium according to claim 14, wherein a specific wavelength passes to the one port.

16. The non-transitory computer readable medium according to claim 13,
   wherein the first component device is an optical splitter, and
   wherein the operations further comprise controlling all ports of the optical splitter to output light.

17. The non-transitory computer readable medium according to claim 13, wherein the operations further comprise allowing light acquired by amplifying spontaneously emitted light to be input to the first component device by activating a light amplification device connected to the first component device.

18. The non-transitory computer readable medium according to claim 13, wherein the port having the light reception level higher than the light reception levels of the other ports is a port having a highest light reception level and a port for which a difference between the highest light reception level and a light reception level of a port having a lowest light reception level is equal to or greater than a predetermined threshold value.

* * * * *